(12) United States Patent
Chen et al.

(10) Patent No.: US 9,811,275 B2
(45) Date of Patent: Nov. 7, 2017

(54) MEMORY SYSTEM AND DATA CONTROL METHOD

(71) Applicant: Toshiba Memory Corporation, Minato-ku (JP)

(72) Inventors: Ju chen Chen, Yokohama (JP); Fumio Hara, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 142 days.

(21) Appl. No.: 14/848,853

(22) Filed: Sep. 9, 2015

(65) Prior Publication Data

US 2016/0253112 A1 Sep. 1, 2016

Related U.S. Application Data

(60) Provisional application No. 62/126,155, filed on Feb. 27, 2015.

(51) Int. Cl.
*G06F 11/00* (2006.01)
*G06F 3/06* (2006.01)
*G06F 12/1009* (2016.01)
*G06F 11/10* (2006.01)

(52) U.S. Cl.
CPC .......... *G06F 3/0619* (2013.01); *G06F 3/0647* (2013.01); *G06F 3/0685* (2013.01); *G06F 11/1072* (2013.01); *G06F 12/1009* (2013.01); *G06F 2212/1032* (2013.01); *G06F 2212/2022* (2013.01); *G06F 2212/7201* (2013.01)

(58) Field of Classification Search
CPC .. G06F 11/141; G06F 11/1072; G06F 11/073; G06F 11/1016
See application file for complete search history.

(56) References Cited

U.S. PATENT DOCUMENTS

| | | | | |
|---|---|---|---|---|
| 8,190,812 B2* | 5/2012 | Yano | ................... | G11C 11/5628 365/185.01 |
| 8,885,406 B2 | 11/2014 | Hosogaya et al. | | |
| 9,208,018 B1* | 12/2015 | Northcott | ............ | G06F 11/1008 |

(Continued)

FOREIGN PATENT DOCUMENTS

| | | |
|---|---|---|
| JP | 2009-048750 | 3/2009 |
| JP | 2009-205555 | 9/2009 |
| JP | 2013-229086 | 11/2013 |

*Primary Examiner* — Charles Ehne
(74) *Attorney, Agent, or Firm* — Oblon, McClelland, Maier & Neustadt, L.L.P.

(57) ABSTRACT

According to one embodiment, in a memory system, a controller is configured to write first data in a page in a block in response to a write request from a host, and update second information used to manage a correspondence between a logical address designated by the write request and a second physical address which is a storage location in the first memory. The controller is configured to perform a first process of updating the first information with the second information and storing the updated information in the first memory. The controller is configured to acquire the first physical address associated to a logical address designated by the write request from the first information. The controller is configured to store, in the first memory, third information including information in which the acquired first physical address and the second physical address are associated.

20 Claims, 13 Drawing Sheets

(56) References Cited

U.S. PATENT DOCUMENTS

| | | | |
|---|---|---|---|
| 2009/0241010 A1* | 9/2009 | Yano | G06F 11/1072 714/764 |
| 2013/0339820 A1* | 12/2013 | Cordero | G06F 11/1048 714/773 |
| 2015/0186261 A1* | 7/2015 | Lin | G06F 11/1469 711/103 |
| 2015/0234706 A1* | 8/2015 | Alrod | G06F 11/1072 714/704 |

* cited by examiner

FIG.4

Diff Table (26)

| PPG | LBA |
|---|---|
| ... | ... |
| PPG #10 | LBA-2 |
| PPG #11 | LBA-0 |
| PPG #12 | LBA-1 |

FIG.5

OldPPGMEM (13)

| new PPG | old PPG |
|---|---|
| PPG #11 | PPG #0 |
| ... | ... |
| ... | ... |
| ... | ... |
| ... | ... |
| ... | ... |

| Data n (n=0..7) | User Data |
|---|---|
| RDT n (n=0..7) | LBA information |
| ECC n (n=0..7) | ECC parity |

FIG. 14

Restore from OldPPGMEM

Search new PPG from OldPPGMEM — S21

Get LBA from old PPG on OldPPGMEM — S22

Replace new PPG with old PPG on System Data — S23

Commit System Data to NAND Flash Memory — S24

FIG. 15

OldPPGMEM

| LBA | old PPG |
|---|---|
| LBA-0 | PPG #0 |
| ... | ... |
| ... | ... |
| ... | ... |
| ... | ... |
| ... | ... |

FIG.18

| WL | Lower | Middle | Upper |
|---|---|---|---|
| WL0 | 0 | 2 | 5 |
| WL1 | 1 | 4 | 8 |
| WL2 | 3 | 7 | 11 |
| WL3 | 6 | 10 | 14 |
| WL4 | 9 | 13 | 17 |
| WL5 | 12 | 16 | 20 |
| WL6 | 15 | 19 | 23 |
| WL7 | 18 | 22 | 26 |
| WL8 | 21 | 25 | 29 |
| WL9 | 24 | 28 | 32 |
| WL10 | 27 | 31 | 35 |
| WL11 | 30 | 34 | 38 |
| WL12 | 33 | 37 | 41 |
| ⋮ | ⋮ | ⋮ | ⋮ |
| WL75 | 222 | 226 | 230 |
| WL76 | 225 | 229 | 233 |
| WL77 | 228 | 232 | 236 |
| WL78 | 231 | 235 | 239 |
| WL79 | 234 | 238 | 242 |
| WL80 | 237 | 241 | 245 |
| WL81 | 240 | 244 | 248 |
| WL82 | 243 | 247 | 251 |
| WL83 | 246 | 250 | 254 |
| WL84 | 249 | 253 | 256 |
| WL85 | 252 | 255 | 257 |

MEMORY SYSTEM AND DATA CONTROL METHOD

CROSS-REFERENCE TO RELATED APPLICATIONS

This application is based upon and claims the benefit of priority from U.S. Provisional Application No. 62/126,155, filed on Feb. 27, 2015 the entire contents of which are incorporated herein by reference.

FIELD

Embodiments described herein relate generally to a memory system and a data control method.

BACKGROUND

In a memory system having a non-volatile memory such as a flash memory, when power interruption occurs during a write operation of data to a predetermined page in a memory cell, there is a possibility to destruct data in another page in the memory cell due to the power interruption.

BRIEF DESCRIPTION OF THE DRAWINGS

FIG. 4 is a diagram illustrating a data structure of a Diff table (second information) in the embodiment;

FIG. 5 is a diagram illustrating a data structure of OldP-PGMEM (third information) in the embodiment;

FIG. 14 is a flowchart illustrating a restoration process from OldPPGMEM in the embodiment;

FIG. 15 is a diagram illustrating a data structure of OldPPGMEM (third information) in a modified example of the embodiment;

FIG. 18 is a diagram illustrating a write order to a page of each memory cell (TLC) in another modified example of the embodiment.

DETAILED DESCRIPTION

In general, according to one embodiment, there is provided a memory system including a first memory, a second memory, and a controller. The first memory is a non-volatile memory. The first memory is configured to include a plurality of blocks and to store first information. The plurality of blocks includes a plurality of word lines. Each word line is connected to a plurality of memory cells. The plurality of memory cells connected to one word line have a storage capacity of two or more pages. The first information is used to manage a correspondence between a logical address and a first physical address which is a storage location in the first memory. The second memory is a volatile memory. The controller is configured to write first data in a page in the block in response to a write request from a host and update second information. The second information is used to manage a correspondence between a logical address designated by the write request and a second physical address which is a storage location in the first memory. The controller is configured to perform a first process of updating the first information with the second information and storing the updated information in the first memory. The controller is configured to acquire the first physical address associated to a logical address designated by the write request from the first information. The controller is configured to store third information in the first memory. The third information includes information in which the acquired first physical address and the second physical address are associated.

Exemplary embodiments of a memory system will be explained below in detail with reference to the accompanying drawings. The present invention is not limited to the following embodiments.

Embodiment

Figure 1:
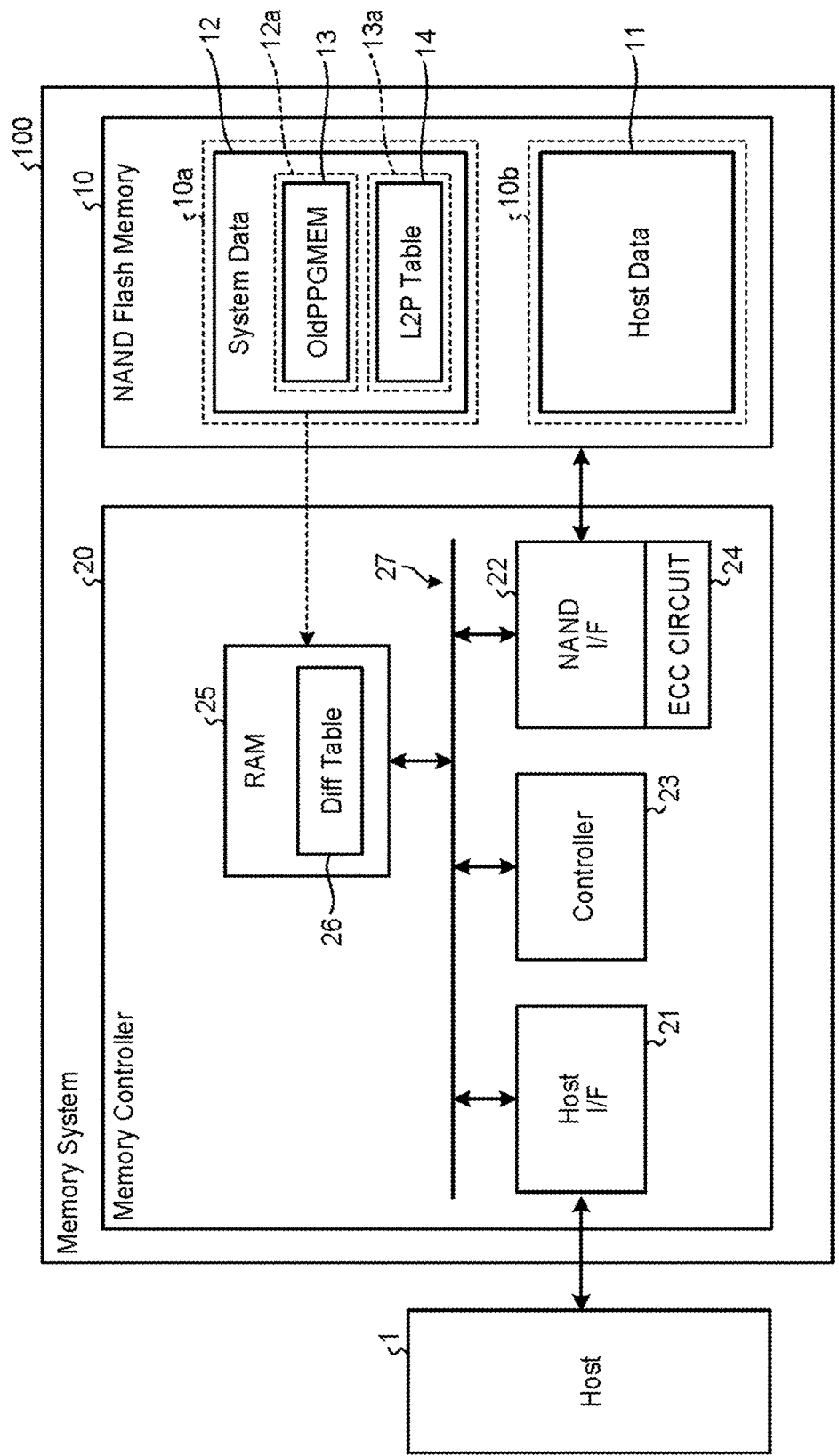
FIG. 1 is a diagram illustrating a configuration of a memory system according to an embodiment.

A memory system 100 according to the embodiment will be described using FIG. 1. FIG. 1 is a block diagram illustrating a configuration of the memory system 100. The memory system 100 is connected to a host 1, and serves as an external storage medium of the host 1. The memory system 100, for example, includes a built-in flash memory in conformity to a UFS (Universal Flash Storage) standard or an eMMC (embedded Multi Media Card) standard, or an SSD (Solid State Drive). The host 1, for example, includes a personal computer, a mobile phone, or an image capturing apparatus.

The memory system 100 includes a NAND flash memory (a non-volatile memory) 10 and a memory controller 20.

The NAND flash memory 10 includes a memory cell array in which the plurality of memory cells are arranged in a matrix manner. Each of the memory cells, for example, is an MLC (Multi Level Cell), and can store multivalued data therein using an upper page and a lower page. The NAND flash memory 10 is configured to include a plurality of arranged blocks as a unit of data erase operation. The plurality of blocks include the plurality of word lines (WL0 to WLn). Each word line is connected to the plurality of memory cells. The plurality of memory cells connected to one word line have a storage capacity of two or more pages. Each page is a unit of write and read data. The NAND flash memory 10, for example, is configured by a plurality of memory chips.

The NAND flash memory 10, for example, includes a storage area 10a and a storage area 10b. The storage area 10a is a storage area for system data, and for example stores system data 12 therein as management information of the memory system 100. The storage area 10*b* is a storage area for user data, and for example stores host data 11 therein. The host data 11 includes the user data.

The storage area 10*a* includes a storage area 12*a* and a storage area 12*b*. The storage area 12*a* stores OldPPGMEM (the third information) 13 therein as described below. The storage area 12*b* stores an L2P table (the first information) 14 therein.

The L2P table 14 is address conversion information in which a logical address (LBA: logical block address) used when the host 1 accesses the memory system 100 and a physical address (block address+page address+in-page storage location) in the NAND flash memory 10 are associated.

The memory controller 20 controls a write operation to the NAND flash memory 10 in response to the write request from the host 1, and controls a read operation from the NAND flash memory 10 in response to a read request from the host 1. The memory controller 20 includes a Host I/F 21, a NAND I/F 22, a controller 23, an ECC circuit 24, and a RAM (a volatile memory) 25. The Host I/F 21, the NAND I/F 22, the controller 23, the ECC circuit 24, and the RAM 25 are connected to each other through an internal bus 27.

The Host I/F 21 performs a process according to an interface standard with respect to the host 1, and outputs a command and the user data received from the host 1 to the internal bus 27. In addition, the Host I/F 21 transmits the user data read out of the NAND flash memory 10 and a response from the controller 23 to the host 1.

The NAND I/F 22 controls a process of writing data to the NAND flash memory 10 and a process of reading data from the NAND flash memory 10 based on an instruction of the controller 23.

The controller 23 collectively controls the respective components of the memory system 100. In a case where a command is received from the host 1 through the Host I/F 21, the controller 23 performs control according to the command. For example, the controller 23 writes the user data and an ECC parity to the NAND flash memory 10 according to the command from the host 1, and instructs the NAND I/F 22 to read the user data from the NAND flash memory 10.

The ECC circuit 24 performs an error correction process (an ECC process). The ECC circuit 24 performs an encoding process of the error correction based on the data transmitted through the internal bus 27 and generates an ECC parity. There may be used a code such as an error correcting code, and for example a BCH code or an RS (Reed-Solomon) code can be used.

The ECC circuit 24 performs a decoding process based on the user data and the parity read out of the NAND flash memory 10. In a case where there is no error in the user data, the user data read out of the NAND flash memory 10 is output to the internal bus 27 without any change. In a case where there is an error in the user data, the user data is subjected to the error correction using the ECC parity and then output to the internal bus 27. In addition, in a case where the decoding process is failed (a case where the error correction is not possible), the ECC circuit 24 notifies an ECC error to the controller 23.

The RAM 25 may be used as a buffer for temporarily storing the data read out of the NAND flash memory 10, or storing the data to be written to the NAND flash memory 10. When a logical-physical conversion process is performed, the RAM 25 temporarily stores a Diff table (the second information) 26 therein.

Next, the outline of the read process in the memory system 100 will be described.

When the read request is received from the host 1, the Host I/F 21 transmits the read request to the controller 23. The controller 23 performs the logical-physical conversion process in which the logical address contained in the read request is associated to the physical address in the NAND flash memory 10, and obtains the physical address of the page to be accessed. The controller 23 designates the physical address and transmits a read instruction to the NAND I/F 22. When the read instruction is received, the NAND I/F 22 generates a read command containing the physical address and transmits the command to the NAND flash memory 10.

Thereafter, the NAND I/F 22 receives the data read out of the NAND flash memory 10. The received data is subjected to the error correction process by the ECC circuit 24, and then stored in the memory of the NAND I/F 22, and transmitted to the host 1 through the Host I/F 21.

Next, the outline of a write process in the memory system 100 will be described.

When a write request is received from the host 1, the Host I/F 21 transmits the write request to the controller 23. The controller 23 performs the logical-physical conversion process in which the logical address contained in the write request is associated to the physical address in the NAND flash memory 10, and obtains the physical address of the page to be accessed. The controller 23 designates the physical address and the data to be written, and transmits a write instruction to the NAND I/F 22. When the write instruction is received, the NAND I/F 22 generates a write command which contains the physical address and the data to be written and transmits the command to the NAND flash memory 10. Therefore, the data is written to the page designated at the physical address.

Figure 2:
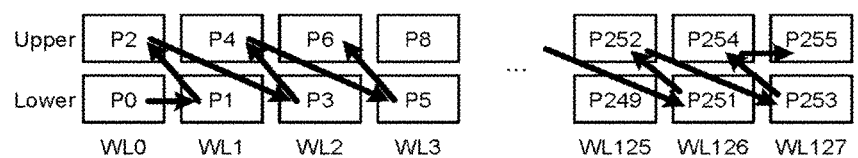
FIG. 2 is a diagram illustrating a write order to a page of each memory cell (MLC) in an embodiment.

Next, a write order to the page of each memory cell (MLC) of the NAND flash memory 10 will be described using FIG. 2. FIG. 2 is a diagram illustrating the write order to the page of each memory cell (MLC). In FIG. 2, the write order in one block is exemplified. In FIG. 2, one block composed of 256 pages is exemplified. The number attached with "P" in FIG. 2 is a number indicating the write order. In FIG. 2, "WLn" (n=0, 1, . . . , 127) indicates an n-th word line, "Lower page n" (n=0, 1, . . . , 127) indicates the lower page connected to the n-th word line, and "Upper page n" (n=0, 1, . . . , 127) indicates the upper page connected to the n-th word line.

For example, in a case where writing is performed on pages having consecutive addresses from the lower page to the upper page, the memory controller 20 can perform the writing in the order illustrated in FIG. 2. In this case, as illustrated in FIG. 2, the write operation is performed on each page in an order of Lower page 0 (P0) of WL0→Lower page 1 (P1) of WL1→Upper page 0 (P2) of WL0→Lower page 2 (P3) of WL2→Upper page 1 (P4) of WL1→Lower page (P5) of WL3→ . . . →Lower page 127 (P253) of WL127→Upper page 126 (P254) of WL126→Upper page 127 (P255) of WL127. In other words, in a case where the lower page is denoted by "L" and the upper page is denoted by "U", the write operation is performed in the page order of L→L→U→L→U→ . . . →L→U→U.

In this way, in each memory cell (MLC) of the NAND flash memory 10, the write operation is performed in the order of the lower page of the word line (n+1) and the upper page of the word line (n) except at the beginning and the end of the block.

Figure 3:
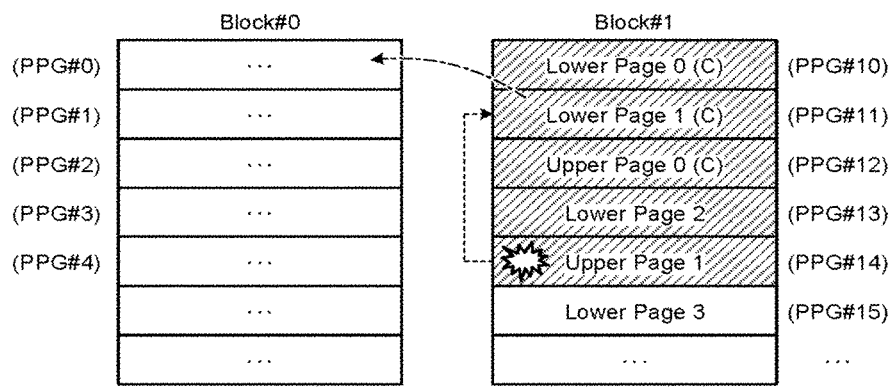
FIG. 3 is a diagram illustrating the write order to the page of each memory cell in the embodiment and a committed page.

For example, as illustrated in FIG. 3, in Block #1, the write operation is performed in the page order of Lower page 0 of WL0→Lower page 1 of WL1→Upper page 0 of WL0→Lower page 2 of WL2→Upper page 1 of WL1. At this time, the logical-physical conversion process of converting the logical address contained in the write request into the physical address in the NAND flash memory 10 is performed in order to write the data to each page, and the result of the logical-physical conversion process is registered in the Diff table 26 as illustrated in FIG. 4. At this time, since a data size to be assigned to the Diff table 26 in the RAM 25 is restricted, the Diff table 26 becomes full and the registration may be not allowed. In this case, all the information registered in the Diff table 26 is written in the storage area 12*b* of the NAND flash memory 10 and becomes non-volatile as a new L2P table 14. In the embodiment, a process of updating the L2P table 14 with the Diff table 26 will be called a commit process (the first process). Further, FIG. 3 is a diagram illustrating a page which is committed in the write order to the page of each memory cell. In FIG. 3, a state where Lower Page 0, Lower Page 1, and Upper Page 0 are completely committed is denoted by "(C)". FIG. 4 is a diagram illustrating a data structure of the Diff table 26.

As a characteristic of each memory cell (MLC) in the NAND flash memory 10, when the data written in Lower Page is committed and then an abnormal power interruption occurs, there is a possibility that data destruction occurs due to the abnormal power interruption. For example, as illustrated in FIG. 3, Lower Page 1 of WL1 is completely committed, but Upper Page 1 of WL1 is not committed yet. When the abnormal power interruption occurs during the write operation of Upper Page 1 of WL1, the error correction of the data written in Upper Page 1 of WL1 is likely to be disabled (the ECC error). When the ECC error occurs in Upper Page 1, there is a possibility that the data of Lower Page 1 is destructed (the destruction will be called an involved destruction) as illustrated by a dashed arrow in FIG. 3. The content of the Diff table 26 is erased due to the abnormal power interruption, but the committed L2P table 14 is stored in the storage area 12*b* in a non-volatile manner. In other words, there is a possibility of an error in the data access in which the host 1 is not possible to access even the logical address associated to the physical address of Lower Page 1 because of the involved destruction due to the abnormal power interruption.

Then, in this embodiment, a correspondence relation between a new physical address associated to the logical address and an old physical address is backed up, and the host 1 is allowed to access the data at the logical address by rewriting a correspondence between the logical address and the new physical address of a data-destructed page into a correspondence between the logical address and the old physical address in the L2P table 14.

Specifically, the logical-physical conversion process of associating a logical address LBA-2 contained in the write request to a physical address PPG #10 of Lower page 0 of WL0 is performed. Then, the result of the logical-physical conversion process is registered in the Diff table 26 as illustrated in FIG. 4, and the data is written in the page (Lower page 0) at the physical address PPG #10.

The logical-physical conversion process of associating a logical address LBA-0 contained in the write request to a physical address PPG #11 of Lower page 1 of WL1 is performed. Then, the result of the logical-physical conversion process is registered in the Diff table 26 (see FIG. 4), and the data is written in the page (Lower page 1) at the physical address PPG #11.

The logical-physical conversion process of associating a logical address LBA-1 contained in the write request to a physical address PPG #12 of Upper page 0 of WL0 is performed. Then, the result of the logical-physical conversion process is registered in the Diff table 26 (see FIG. 4), and the data is written in the page (Upper page 0) at the physical address PPG #12.

At the time when the result of the logical-physical conversion process of associating the logical address LBA-1 to the physical address PPG #12 is registered in the Diff table 26, in a case where the Diff table 26 becomes full as illustrated in FIG. 4, the commit process is performed and the OldPPGMEM 13 is generated as illustrated in FIG. 5. FIG. 5 is a diagram illustrating a data structure of the OldPPGMEM 13.

At this time, the memory controller 20 sets a PPG (the physical address) registered before the updating of the L2P table 14 in the NAND flash memory 10 as an old PPG, and saves the PPG in the OldPPGMEM 13 as illustrated in FIG. 5.

For example, the OldPPGMEM 13 is generated on the RAM 25. The OldPPGMEM 13 includes information in which the new physical address is associated to the old physical address associated in the past to the same logical address with the new physical address. The L2P table 14 before the updating in the NAND flash memory 10, for example, is configured as illustrated in the left part of FIG. 6.

Figure 6:
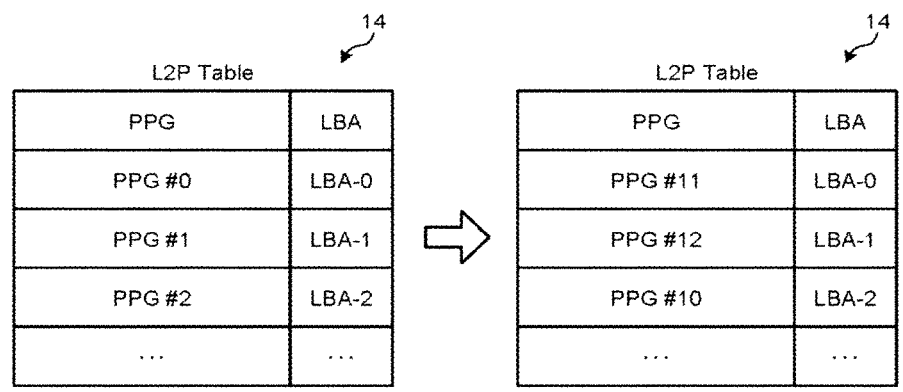
FIG. 6 is a diagram illustrating a data structure and a commit process of an L2P table (first information) in the embodiment.

The old physical address associated to the logical address LBA-0 can be confirmed as PPG #0 by referring the L2P table 14 before the updating (see the left part of FIG. 6). The new physical address associated to the logical address LBA-0 can be confirmed as PPG #11 by referring the Diff table 26 (see FIG. 4). Therefore, PPG #11 can be registered as the new physical address, and PPG #0 as the old physical address in the OldPPGMEM 13.

Further, for the purpose of preventing an error in the data access due to the involved destruction, a page to be saved in the OldPPGMEM 13 can be restricted to the lower page where the upper page is not committed. In other words, in a case where all the pages sharing the word line are completely committed or become the next commit target, the memory controller 20 generates the OldPPGMEM 13 to exclude each page belonging to all the pages from the new physical address. For example, in the case of FIG. 3, since the pages at the physical addresses PPG #10 and PPG #12 are not included in the lower page where the upper page is not committed among the committed pages (the physical addresses PPG #10 to PPG #12), the registration of the physical addresses PPG #10 and PPG #12 can be skipped.

When the new physical address and the old physical address are completely registered to the OldPPGMEM 13 on the RAM 25, the OldPPGMEM 13 on the RAM 25 is written in the NAND flash memory 10 and becomes non-volatile.

Then, the memory controller 20 updates the L2P table 14 in the left part of FIG. 6 into the L2P table 14 in a right part of FIG. 6 using the information of the Diff table 26. In other words, the memory controller 20 performs the commit process in which the Diff table 26 becomes non-volatile. In FIG. 3, the state where the pages at the physical addresses PPG #10 to PPG #12 are committed is denoted by "(C)". In addition, the final page location (in the case of FIG. 3, the physical address PPG #12) in which the host data is written during the commit process is also registered in the NAND flash memory 10.

Thereafter, the memory controller 20 writes data in an order of Lower page 2 of WL2 and Upper page 1 of WL1.

For example, as illustrated in FIG. 3, in a case where the abnormal power interruption occurs during the write operation of Upper page 1 of WL1, the memory controller 20 reads the information of "the final page location where the host data is written" out of the NAND flash memory 10 after power restoration. The memory controller 20 performs initialization from the next page of "the final page location where the host data is written" (in the case of FIG. 3, PPG #13). When the initialization is performed, the memory controller 20 also confirms whether there is the data destruction due to the abnormal power interruption.

In addition, the initialization area can be restricted to a page where the data is written and no commit is made (in the case of FIG. 3, the pages not denoted by "(C)" among the shaded areas). The determination on whether the data is written can be made by checking whether the data read out of the page is an erase level. In other words, the initialization area ranges from the next page of "the final page location where the host data is written" to a page immediately before a location of which the page is in an erase state. For example, in the case of FIG. 3, since the data read out of Lower Page 3 is in the erase state, it is determined that Lower Page 3 is not written with the data.

The memory controller 20 confirms whether there occurs the data destruction in each page where the data is written and no commit is made. For example, the memory controller 20 reads the data from the upper page among the respective pages where the data is written and no commit is made, and confirms whether the read-out data has an ECC uncorrectable error. When the ECC uncorrectable error is found out in the upper page, the memory controller 20 reads the data of the page on a lower side corresponding to the upper page (corresponding to the same word line), and confirms whether the read-out data has the ECC uncorrectable error.

FIG. 3 illustrates a case where the abnormal power interruption occurs during the write operation of the data of Upper Page 1, the data read out of Upper Page 1 has the ECC uncorrectable error, and the data read out of Lower Page 1 has the ECC uncorrectable error. When it is confirmed that the data read out of Lower Page 1 has the ECC uncorrectable error, the memory controller 20 reads the OldPPGMEM 13 from the NAND flash memory 10 out to the RAM 25. The memory controller 20 can specify that the old physical address associated in the past to the same logical address with the physical address PPG #11 of Lower Page 1 with reference to the read OldPPGMEM 13 (see FIG. 5) is PPG #0.

Since the information of the logical address is not included in the OldPPGMEM 13, it is not possible to specify the logical address associated by the physical address PPG #11 even with reference to the OldPPGMEM 13.

Figures 7A, 7B:
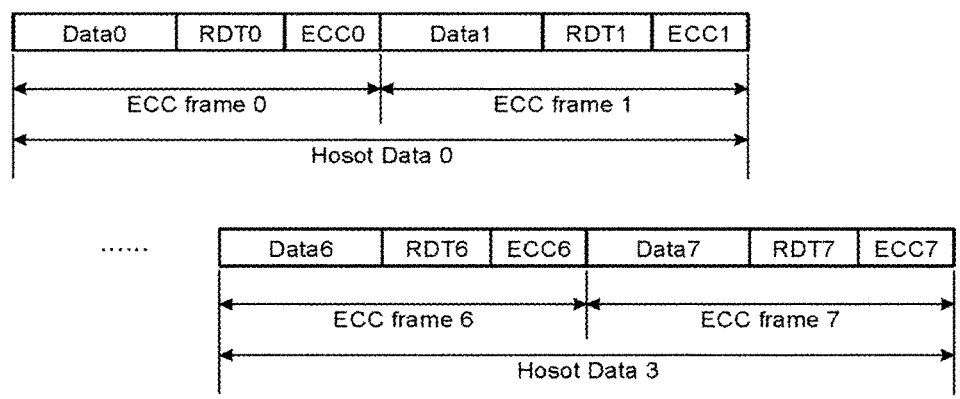
FIGS. 7A and 7B are diagrams illustrating the data structure of host data in the embodiment.

Herein, the host data includes the logical address used when the data is written as illustrated in FIGS. 7A and 7B. FIGS. 7A and 7B are diagrams illustrating a data structure. The host data k (k is an integer) includes an ECC frame 2k and an ECC frame 2k+1. Each of the ECC frames n (n=0, . . . , 7) includes Data n (data body) containing the user data, RDT n containing the logical address, and ECC n containing the ECC parity. Therefore, the memory controller 20 reads the data from the page at a specified physical address PPG #0 and confirms the RDT n portion so as to specify that the logical address associated in the past to the physical address PPG #0 is LBA-0 for example.

Figure 8:
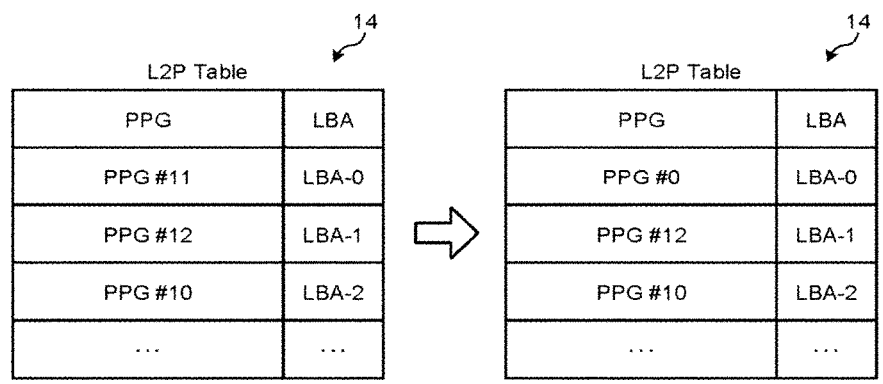
FIG. 8 is a diagram illustrating a restoration process in the embodiment.

Then, the memory controller 20 reads the L2P table 14 from the NAND flash memory 10 out to the RAM 25. As illustrated in FIG. 8, in the read L2P table 14, the memory controller 20 rewrites a correspondence between the logical address LBA-0 and the physical address PPG #11 into a correspondence between the logical address LBA-0 and the physical address PPG #0. In other words, the memory controller 20 overwrites and updates the physical address PPG #11 in the read L2P table 14 with the physical address PPG #0. The memory controller 20 rewrites the updated L2P table 14 to the NAND flash memory 10 and performs the commit process again. FIG. 8 is a diagram illustrating a restoration process.

Therefore, as illustrated by a dashed arrow in FIG. 3, when the host 1 refers the logical address LBA-0, the page at the physical address PPG #0 where the data is not destructed is accessed instead of the page at the physical address PPG #11 where the data is destructed. As a result, the state of the logical address LBA-0 can be restored from an inaccessible state of the host 1 to an accessible state.

It should be noted that, in a case where the physical address PPG #11 where the data is destructed is not the updated physical address associated to the corresponding logical address, the data access using the logical address is excluded from the restoration target.

Figure 9:
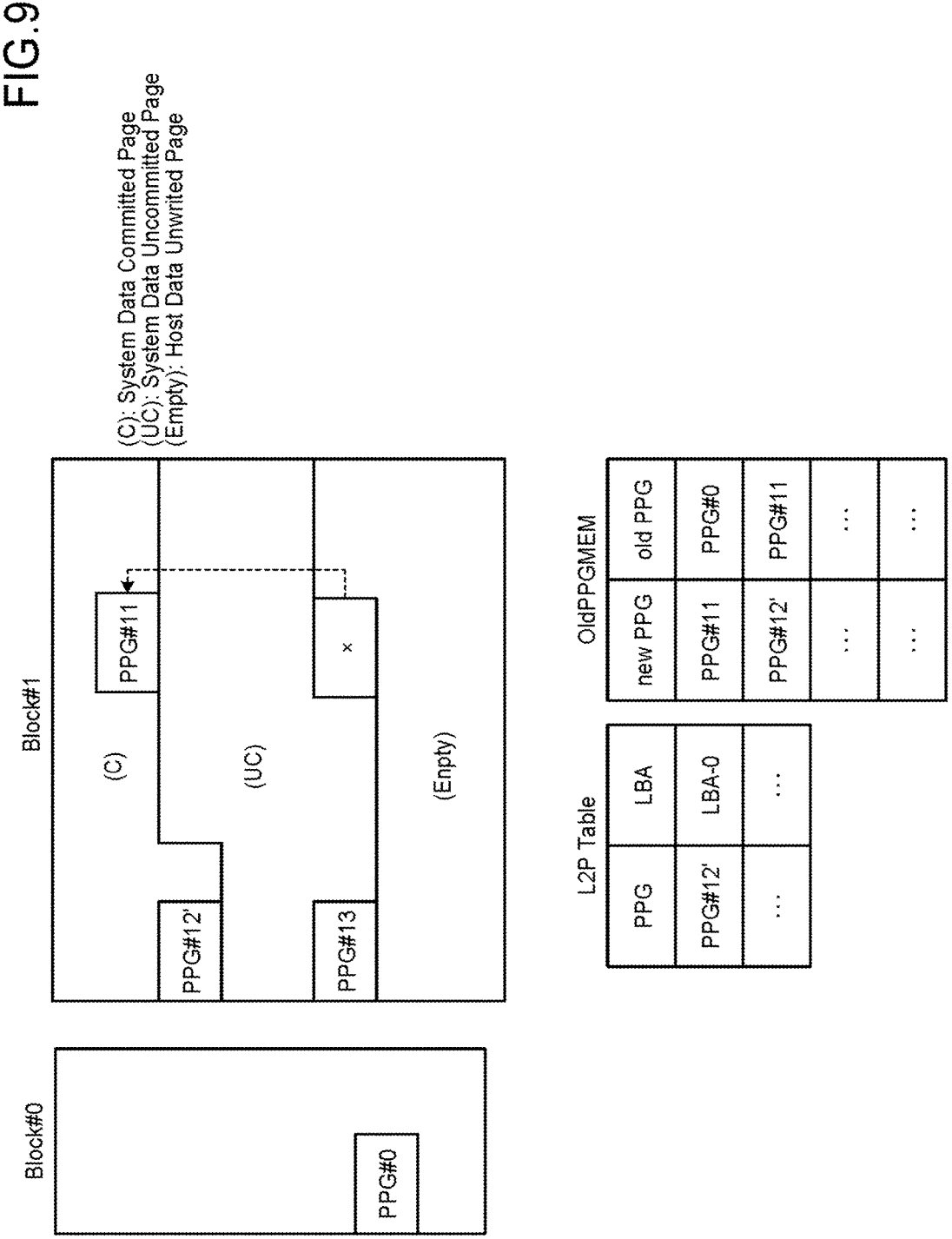
FIG. 9 is a diagram illustrating the case of exception from a restoration target in the embodiment.

For example, as illustrated in FIG. 9, in a case where there is the updated physical address with respect to the same logical address in the committed area (C), the data access using the logical address is excluded from the restoration target. For example, in a case where the OldPPGMEM 13 is retrieved and the physical address "PPG #11" where the data is destructed is registered as the old physical address, it is possible to specify that the updated physical address with respect to the same logical address LBA-0 is another physical address (for example, PPG #12'). In other words, when the host 1 refers the logical address LBA-0, the page at the physical address PPG #12' where the data is not destructed is accessed, so that it is not necessary for the data access using the logical address to be restored.

Figure 10:
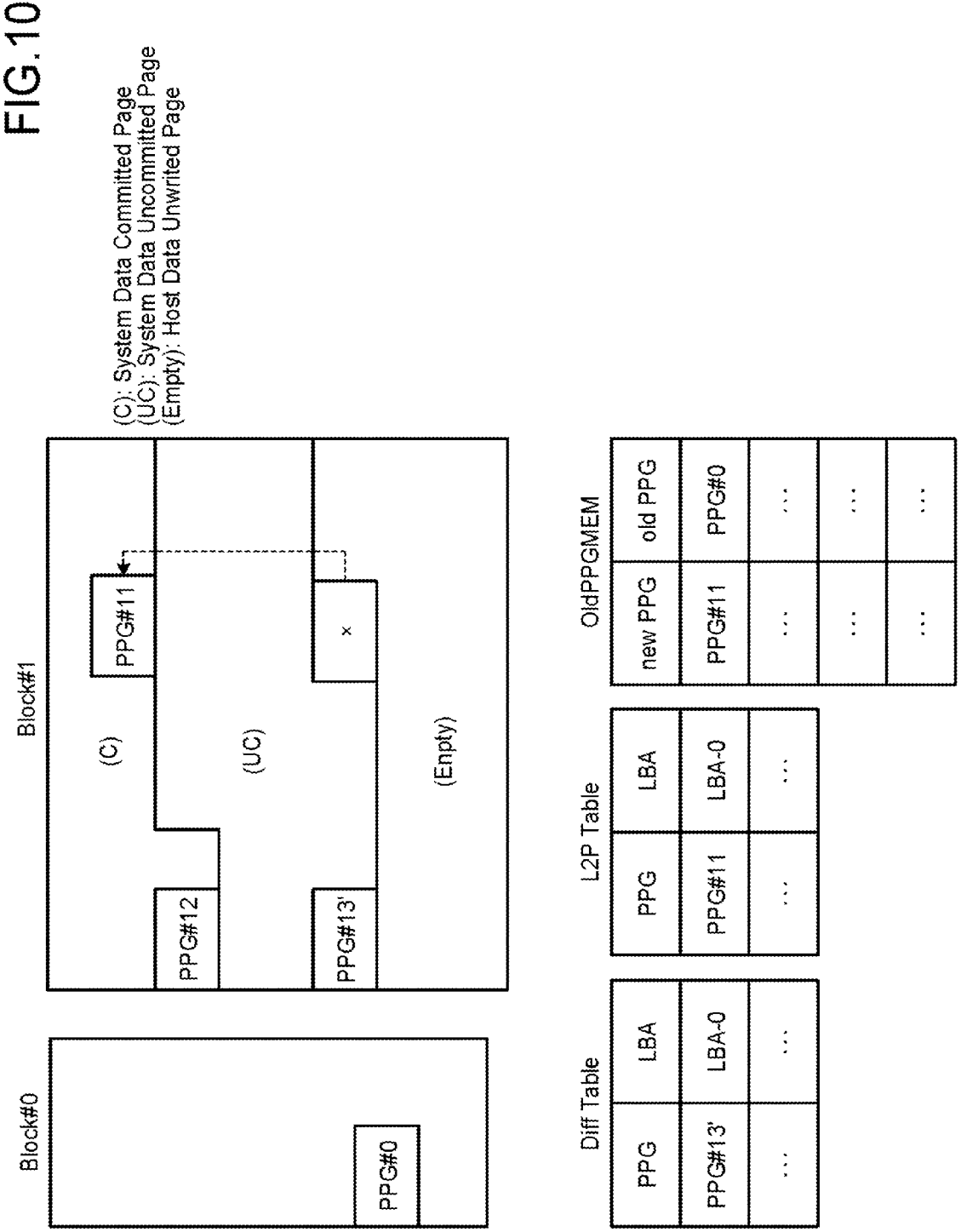
FIG. 10 is a diagram illustrating another case of exception from the restoration target in the embodiment.

Alternatively, for example, as illustrated in FIG. 10, in a case where there is the updated physical address with respect to the same logical address in the uncommitted area (UC), the logical address is excluded from the restoration target. When the initialization is performed at the time of the power restoration after the abnormal power interruption, the memory controller 20 restores the written data in the area (UC). At this time, when the data is read out of each page in the uncommitted area (UC), the memory controller 20 can acquire the logical address. Since the memory controller 20 can confirm the physical address of each page, the memory controller 20 can register the physical address and the logical address in the Diff table 26 to restore the Diff table 26 after the confirmation. In addition, the memory controller 20 reads the L2P table 14 from the NAND flash memory 10 out to the RAM 25. The memory controller 20 compares the restored Diff table 26 with the read-out L2P table 14. The memory controller 20 specifies the logical address LBA-0 corresponding to a physical address "PPG #11" where the data in the L2P table 14 is destructed, and confirms that the physical address corresponding to the logical address LBA-0 in the Diff table 26 is another physical address PPG #13'. In other words, the memory controller 20 can confirm that the updated physical address with respect to the same logical address LBA-0 is another physical address (for example, PPG #13'). In other words, when the host 1 refers the logical address LBA-0, the page at the physical address PPG #13' where the data is destructed is accessed, so that the data access using the logical address is not necessarily restored.

Figure 11:
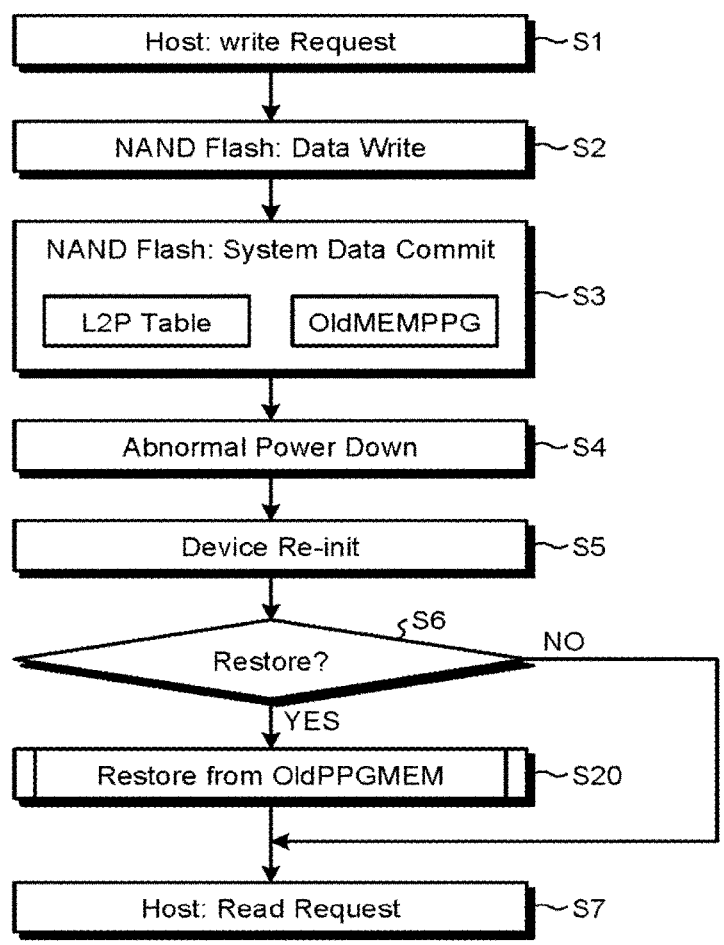
FIG. 11 is a flowchart illustrating an operation of the memory system in the embodiment.
Figure 12:
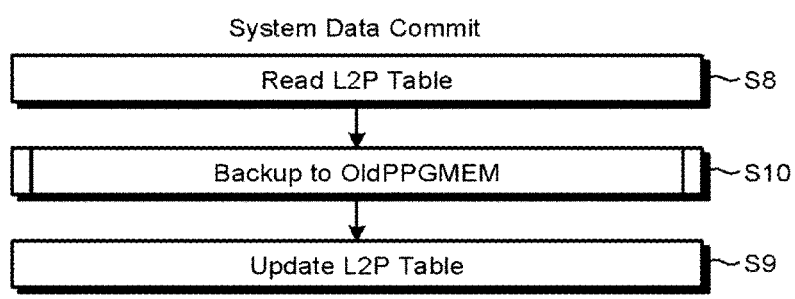
FIG. 12 is a flowchart illustrating the commit process in the embodiment.
Figure 13:
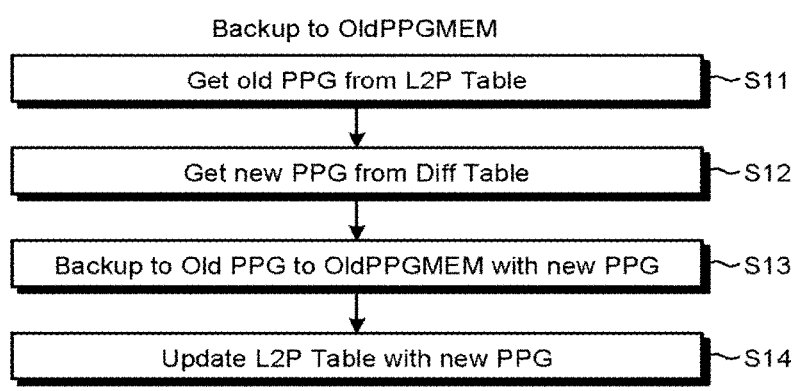
FIG. 13 is a flowchart illustrating a backup process to OldPPGMEM in the embodiment.

Next, the operation of the memory system 100 will be described using FIGS. 11 to 14. FIG. 11 is a flowchart illustrating the operation of the memory system 100. FIG. 12 is a flowchart illustrating the commit process in the embodiment. FIG. 13 is a flowchart illustrating a backup process to the OldPPGMEM in the embodiment. FIG. 14 is a flowchart illustrating a restoration process from the OldPPGMEM in the embodiment.

When the write request is received from the host 1 (S1), the memory controller 20 writes the data in the NAND flash memory 10 in response to the write request (S2). At this time, when it is determined that the Diff table 26 becomes full and the registration is not allowed any more, the memory controller 20 performs the commit process (S3) together with the backup process to the OldPPGMEM 13 (S10).

In the commit process (S3), for example, the memory controller 20 reads the L2P table 14 from the NAND flash memory 10 and stores the table in the RAM 25 (S8), and performs the backup process to the OldPPGMEM 13 (S10). In other words, the backup process (S10) is performed during the commit process (S3).

In the backup process (S10), for example, the memory controller 20 accesses the L2P table 14 on the RAM 25, and acquires the old physical address associated to a predetermined logical address (S11). The memory controller 20 accesses the Diff table 26 on the RAM 25, and acquires the new physical address associated to a predetermined logical address (S12). The memory controller 20 registers the new physical address acquired in S12 and the old physical address acquired in S11 in correspondence with each other in the OldPPGMEM 13 on the RAM 25 and also stores the addresses in the storage area 12*a* in a non-volatile manner (S13). Then, the memory controller 20 updates the L2P table 14 on the RAM 25 using the information of the Diff table 26 (S14).

In the commit process (S3), when the backup process (S10) is completed, the memory controller 20 stores the L2P table 14 updated on the RAM 25 in the storage area 12*b* in the non-volatile manner. In other words, the memory controller 20 updates the L2P table 14 in the NAND flash memory 10 with the information of the Diff table 26 (S9).

When the abnormal power interruption (S4) occurs, the memory controller 20 performs the initialization on the area where the data is written and no commit is made at the time of the power restoration (S5). In addition, the memory controller 20 also confirms whether there occurs the data destruction due to the abnormal power interruption, and determines whether the restoration process is necessary (S6).

For example, in a case where there is no upper page of the ECC uncorrectable error, the memory controller 20 considers that the restoration process is not necessary (No in S6), and the process proceeds to S7.

For example, when the upper page of the ECC uncorrectable error is found out, the memory controller 20 determines that the abnormal power interruption occurs during the write operation of the upper page, and reads the data of the lower page corresponding to the upper page (corresponding to the same word line). The memory controller 20 confirms whether the read data has the ECC uncorrectable error.

In a case where the read data has no ECC uncorrectable error, the memory controller 20 considers that the restoration process is not necessary (No in S6), and the process proceeds to S7.

In a case where the read data is the ECC uncorrectable error, the memory controller 20 determines whether the physical address of the page is the updated physical address associated to the logical address. For example, in a case where the physical address of the page is registered as the old physical address in the OldPPGMEM 13, it is determined that the physical address of the page is not the updated physical address associated to the logical address, so that the restoration process is not necessary (No in S6) and the process proceeds to S7. Alternatively, for example, in a case where the Diff table 26 is restored and the logical address associated to the physical address of the page is associated to another physical address in the restored Diff table 26, the restoration process is not necessary (No in S6) and the process proceeds to S7.

In a case where the physical address of the page is the updated physical address associated to the logical address, the memory controller 20 needs to perform the restoration process (Yes in S6) and the process proceeds to S20.

In the restoration process (S20), for example, the memory controller 20 reads the OldPPGMEM 13 from the NAND flash memory 10 for reference, and retrieves the old physical address associated to the physical address (the new physical address) of the page of the ECC uncorrectable error (S21). The memory controller 20 reads the data from the old physical address found out in S21, and refers the RDT n portion of the read data to acquire the logical address (S22). The memory controller 20 reads the L2P table 14 from the NAND flash memory 10 out to the RAM 25. The memory controller 20 overwrites the physical address associated to the logical address acquired in S22 in the read L2P table 14 with the old physical address retrieved in S21 for the update (S23). The memory controller 20 rewrites and commits the updated L2P table 14 in the NAND flash memory 10 (S24).

When the read request is received from the host 1 (S7), the memory controller 20 refers the L2P table 14 in response to the read request, and reads the data from the NAND flash memory 10. For example, when the host 1 refers the logical address LBA-0, the page at the physical address PPG #0 where the data is not destructed is accessed instead of the page at the physical address PPG #11 where the data is destructed. As a result, the state of the logical address LBA-0 can be restored from an inaccessible state of the host 1 to an accessible state.

As described above, in the embodiment, in the memory system 100, in a case where the power interruption occurs during the write operation of the data to the corresponding upper page in a state where the data in the lower page at the first physical address is committed, the memory controller 20 specifies the physical address of the page subjected to the write operation at the same second logical address with the first physical address in the past to the second physical address using the OldPPGMEM 13 stored in the storage area 12*a*. The memory controller 20 rewrites a correspondence between the second logical address and the first physical address in logical-physical address conversion information stored in the storage area 12*b* into a correspondence between the second logical address and the second physical address. Therefore, when the host 1 refers the second logical address, the page at the second physical address where the data is not destructed is accessed instead of the page at the first physical address where the data is destructed. As a result, the state of the second logical address can be restored from an inaccessible state of the host 1 to an accessible state.

In addition, compared to the case where a backup of the data is stored in the storage area 10*b* as a countermeasure against the involved destruction, there is no need to secure the storage area 10*b* for the user data in order to back up the data. Therefore, it is possible to improve a dirty write performance, and a performance WAF≅(Actual Write Capacity of NAND Flash Memory)/(Write Capacity from Host) can be improved.

It should be noted that, as illustrated in FIG. 15, the OldPPGMEM 13 may be information in which the logical address and the old physical address are associated. FIG. 13 is used as a flowchart illustrating a flow of the backup process (S10) in this modified example. In this case, in the backup process (S10), for example, the memory controller 20 reads the data from the page at the new physical address registered in the Diff table 26, and specifies the logical address from the RDT n portion of the read data (S11). The memory controller 20 accesses the L2P table 14 in the NAND flash memory 10, and specifies the old physical address associated to the specified logical address (S12). The memory controller 20 registers the logical address specified in S11 and the old physical address specified in S12 in the OldPPGMEM 13 on the RAM 25 in association with each other, and stores the addresses in the storage area 12a in the non-volatile manner (S13). Then, the memory controller 20 updates the L2P table 14 on the RAM 25 using the information of the Diff table 26 (S14).

Figure 16:
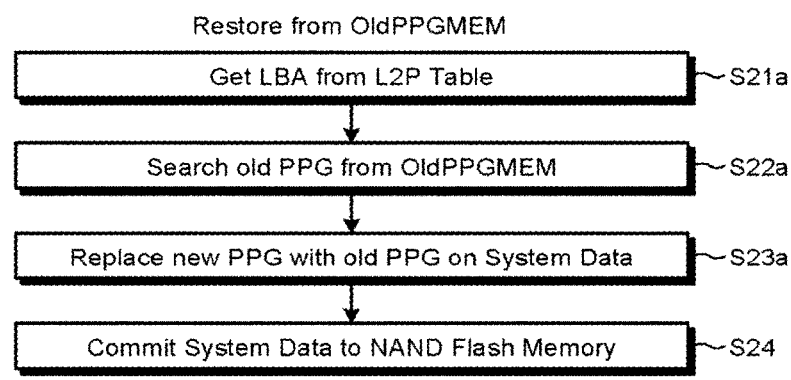
FIG. 16 is a flowchart illustrating the restoration process from OldPPGMEM in the embodiment.

In addition, in the restoration process (S20), for example, as illustrated in FIG. 16, the memory controller 20 reads the L2P table 14 from the NAND flash memory 10 for reference, and acquires the logical address associated to the physical address (the new physical address) of the page of the ECC uncorrectable error (S21a). The memory controller 20 reads the OldPPGMEM 13 from the NAND flash memory 10 for reference, and retrieves the old physical address corresponding to the logical address found out in S21a (S22a). The memory controller 20 overwrites the physical address corresponding to the logical address acquired in S21a with the old physical address retrieved in S22a in the L2P table 14 read out onto the RAM 25 for the update (S23a). The memory controller 20 rewrites the updated L2P table 14 to the NAND flash memory 10 and performs the commit process again (S24).

Figure 17:
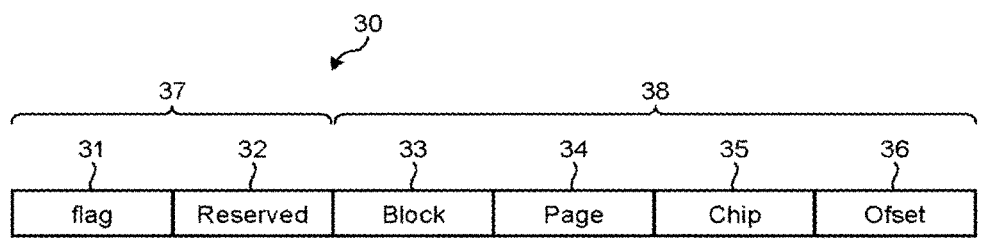
FIG. 17 is a diagram illustrating a data structure of PPG (a physical address) in another modified example of the embodiment.

Alternatively, the memory system 100 may notify the execution of the restoration process to the host 1. For example, as illustrated in FIG. 17, a data structure of the physical address includes an area 37 and an area 38. FIG. 17 is a diagram illustrating the data structure of a physical address 30. The physical address 30 includes the area 37 and the area 38. The area 38 is an area of an address body, and includes a block address 33, a page address 34, a chip address 35, an offset address (a storage location in the page) 36. In the area 37, since there is an unused area, a flag 31 indicating whether the restoration process is performed may be included. The area except the flag 31 in the area 37 is denoted as a reserved 32 for the convenience sake.

For example, in the restoration process (S20) illustrated in FIG. 14, when the memory controller 20 overwrites the physical address corresponding to the logical address acquired in S22 with the old physical address retrieved in S21 in the L2P table 14 for the update (S23), the flag 31 in the old physical address is set. Thereafter, in the operation illustrated in FIG. 11, the memory controller 20 receives the read request from the host 1 (S7), refers the L2P table 14 in response to the read request, and reads the data from the NAND flash memory 10. When referring the L2P table 14, the physical address corresponding to the logical address contained in the read request is checked, but it is possible to confirm whether the data is subjected to the restoration process by checking whether the flag 31 in the physical address is set. When a read response (read data+relevant information) is returned to the host 1, the memory controller 20 includes the flag 31 in the read response. Therefore, the host 1 can determine whether the read data is subjected to the restoration process.

Alternatively, each memory cell in the NAND flash memory 10 may be a TLC (Triple Level Cell) storage cell. In a case where each of the memory cells is the TLC (Triple Level Cell) storage cell, 3-bit information can be accumulated in one memory cell. In the case of the TLC, three pages (a lower page, a middle page, and an upper page) are connected to one word line. In this case, the write order for the page of each memory cell (MLC) of the NAND flash memory 10 is exemplified as illustrated in FIG. 18.

FIG. 18 illustrates the write order for one block. In the case of FIG. 18, one block is configured by 258 pages which include page 0 to page 257. The number attached in FIG. 18 is a number indicating the write order. Herein, for the convenience of explanation, the page numbers are matched with the numbers indicating the write order, but the page numbers may be assigned by another assigning method.

As illustrated in FIG. 18, the write operation is performed on the respective pages in an order of Lower page 0 of WL0, Lower page 1 of WL1, Middle page 2 of WL0, Lower page 3 of WL2, Middle page 4 of WL1, Upper page 5 of WL0, Lower page 6 of WL3, Middle page 7 of WL2, Upper page 8 of WL1, . . . , Lower page 252 of WL85, Middle page 253 of WL84, Upper page 254 of WL83, Middle page 255 of WL85, Upper page 256 of WL84, and Upper page 257 of WL85. In other words, in a case where the lower page is denoted by "L", the middle page is denoted by "M", and the upper page is denoted by "U", the write operation is performed in the page order of L→L→M→L→M→U→L→M→U→ . . . →L→M→U→M→U→U.

In this way, in each memory cell (TLC) of the NAND flash memory 10, the write operation is performed in the order of the lower page of the word line (n+2), the middle page of the word line (n+1), and the upper page of the word line (n) except at the beginning and the end of the block.

For example, when the abnormal power interruption occurs during the write operation of Middle Page 2 of WL1, the error correction of the data written in Middle Page 2 of WL1 is likely to be disabled (the ECC error). When the ECC error occurs in Middle Page 2 of WL1, there is a possibility that the data of Lower Page 1 of WL1 is destructed (the involved destruction).

Alternatively, for example, when the abnormal power interruption occurs during the write operation of Upper Page 8 of WL1, the error correction of the data written in Upper Page 8 of WL1 is likely to be disabled (the ECC error). When the ECC error occurs Upper Page 8 of WL1, there is a possibility that the data of Lower Page 1 of WL1 and Middle Page 2 of WL1 is destructed (the involved destruction).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile memory configured to include a plurality of blocks and to store first information, the plurality of blocks including a plurality of word lines, each word line being connected to a plurality of memory cells, the plurality of memory cells connected to one word line having a storage capacity of two or more pages, the first information being used to manage a correspondence between logical addresses and physical addresses, the physical addresses specifying storage locations in the non-volatile memory; and a controller configured to receive a first write request from a host, the first write request designating a first logical address, write first data in a first storage location in the non-volatile memory in response to the first write request, the first storage location corresponding to a first physical address, register the first physical address as a physical address corresponding to the first logical address in the first information, receive a second write request from the host, the second write request designating the first logical address, write second data in a second storage location in the non-volatile memory in response to the second write request, the second storage location corresponding to a second physical address, perform a first process of changing a physical address corresponding to the first logical address in the first information from the first physical address to the second physical address, store in the non-volatile memory second information in which the first physical address and the second physical address are associated, and perform a second process of changing a physical address corresponding to the first logical address in the first information from the second physical address to the first physical address, with using the second information.

2. The memory system according to claim 1, wherein the controller is configured to read the second data in the second storage location and perform an error correction on the read second data, and in a case where the error correction is failed, perform the second process.

3. The memory system according to claim 2, wherein the first data includes data designated by the first write request and the first logical address corresponding to the data, and the controller is configured to in a case where an abnormal power interruption occurs, after power restoration, sequentially read data in a block from a page in the next write order of the pages in the block where the writing operation is performed at the last among target pages of the first process to perform a first error correction, in a case where the first error correction is failed, determine whether there is data which is of a second page sharing the word line with a first page failed in the error correction and already subjected to the first process, in a case where there is the data, read the data of the second page to perform a second error correction, in a case where the second error correction is failed, acquire the first physical address associated to the physical address of the second page from the second information, read the first data stored in the first physical address based on the acquired first physical address, and update the first information with information in which a logical address contained in the read-out first data and a physical address of the second page are associated.

4. The memory system according to claim 3, wherein the second information contains a correspondence between a new physical address and an old physical address, both of which are associated to a same logical address, in a case where the second error correction is failed, the controller refers the second information, and in a case where the physical address of the second page is contained in the second information as the old physical address, the first information is not updated using the second information.

5. The memory system according to claim 3, further comprising a volatile memory to store third information, the third information being used to manage a correspondence between logical addresses and physical addresses, the physical addresses specifying storage locations in the non-volatile memory, wherein after the power restoration, the controller sequentially reads data in a block from a page in the next write order of the pages in the block where the writing operation is performed at the last among target pages of the first process, and restores the third information using the logical address contained in the read data and the physical address of the read page, in a case where the second error correction is failed, the controller acquires the logical address associated to the physical address of the second page from the first information, and in a case where the logical address acquired from the first information is associated to a third physical address different from the second physical address in the restored third information, the first information is not updated using the second information.

6. The memory system according to claim 3, wherein after the power restoration, the controller sequentially reads the data in the block from the page in the next write order of the pages in the block where the writing operation is performed at the last before the page in an erase state among the target pages of the first process to perform the first error correction.

7. The memory system according to claim 3, wherein the information where the logical address contained in the read-out first data and the physical address of the second page are associated contains fourth information which indicates that the first information is updated using the second information, and the controller includes the fourth information in a read response which responds to a read request from the host.

8. The memory system according to claim 1, wherein the second information contains a correspondence between a new physical address and an old physical address, both of which are associated to a same logical address, and the controller generates the second information such that each page sharing the word line in which all the pages are the target of the first process is excluded from the new physical address, and stores the second information in the non-volatile memory.

9. The memory system according to claim 1, wherein the plurality of memory cells connected to the one word line have a storage capacity of two pages, and the controller performs writing in an order of a lower page of a word line (n+1) and an upper page of a word line (n), 'n' being 0 or a natural number.

10. The memory system according to claim 1,
wherein the plurality of memory cells connected to the one word line have a storage capacity of three pages, and the controller performs writing operation in an order of a lower page of a word line (n+2), a middle page of a word line (n+1), and an upper page of a word line (n) (n is 0 or a natural number).

11. A memory system comprising:

a non-volatile memory configured to include a plurality of blocks and to store first information, the plurality of blocks including a plurality of word lines, each word line being connected to a plurality of memory cells, the plurality of memory cells connected to one word line having a storage capacity of two or more pages, the first information being used to manage a correspondence between logical addresses and physical addresses, the physical addresses specifying storage locations in the non-volatile memory; and a controller configured to receive a first write request from a host, the first write request designating a first logical address, write first data in a first storage location in the non-volatile memory in response to the first write request, the first storage location corresponding to a first physical address, register the first physical address as a physical address corresponding to the first logical address in the first information, receive a second write request from the host, the second write request designating the first logical address, write second data in a second storage location in the non-volatile memory in response to the second write request, the second storage location corresponding to a second physical address, perform a first process of changing a physical address corresponding to the first logical address in the first information from the first physical address to the second physical address, store in the non-volatile memory second information in which the first physical address and the logical address are associated, and perform a second process of changing a physical address corresponding to the first logical address in the first information from the second physical address to the first physical address, with using the second information.

12. The memory system according to claim 11, wherein the controller is configured to read the second data in the second storage location and perform an error correction on the read second data, and in a case where the error correction is failed, perform the second process.

13. The memory system according to claim 12, wherein the first data includes data designated by the first write request and the first logical address corresponding to the data, and the controller is configured to in a case where an abnormal power interruption occurs, after power restoration, sequentially read data in a block from a page in the next write order of the pages in the block where the writing operation is performed at the last among target pages of the first process to perform a first error correction, in a case where the first error correction is failed, determine whether there is data which is of a second page sharing the word line with a first page failed in the error correction and already subjected to the first process, in a case where there is the data, read the data of the second page to perform a second error correction, in a case where the second error correction is failed, acquire the logical address associated to the physical address of the second page from the first information, acquire the first physical address associated to the acquired logical address from the second information, and update the first information with information in which the acquired logical address and the first physical address are associated.

14. A data control method of a memory system which includes a non-volatile memory configured to include a plurality of blocks and to store first information, the plurality of blocks including a plurality of word lines, each word line being connected to a plurality of memory cells, the plurality of memory cells connected to one word line having a storage capacity of two or more pages, the first information being used to manage a correspondence between logical addresses and physical addresses, the physical addresses specifying storage locations in the non-volatile memory, the method comprising:

receiving a first write request from a host, the first write request designating a first logical address, writing first data in a first storage location in the non-volatile memory in response to the first write request, the first storage location corresponding to a first physical address, registering the first physical address as a physical address corresponding to the first logical address in the first information, receiving a second write request from the host, the second write request designating the first logical address, writing second data in a second storage location in the non-volatile memory in response to the second write request, the second storage location corresponding to a second physical address;

performing a first process of changing a physical address corresponding to the first logical address in the first information from the first physical address to the second physical address;

storing in the non-volatile memory second information in which the first physical address and the second physical address are associated, and perform a second process of changing a physical address corresponding to the first logical address in the first information from the second physical address to the first physical address, with using the second information.

15. The data control method according to claim 14, further comprising:

reading the second data in the second storage location and performing an error correction on the read second data, in a case where the error correction is failed, performing the second process.

16. The data control method according to claim 15, wherein the first data includes data designated by the first write request and the first logical address corresponding to the data, and the data control method further comprising:

in a case where an abnormal power interruption occurs, after power restoration, sequentially reading data in a block from a page in the next write order of the pages in the block where the writing operation is performed at the last among target pages of the first process to perform a first error correction;

in a case where the first error correction is failed, determining whether there is data which is of a second page sharing the word line with a first page failed in the error correction and already subjected to the first process;

in a case where there is the data, reading the data of the second page to perform a second error correction;

in a case where the second error correction is failed, acquiring the first physical address associated to the physical address of the second page from the second information;

reading the first data stored in the first physical address based on the acquired first physical address; and updating the first information with information in which a logical address contained in the read-out first data and a physical address of the second page are associated.

17. The data control method according to claim 16, wherein the second information contains a correspondence between a new physical address and an old physical address, both of which are associated to a same logical address, and the data control method further comprising:

in a case where the second error correction is failed, referring the second information; and in a case where the physical address of the second page is contained in the second information as the old physical address, not updating the first information using the second information.

18. The data control method according to claim 16, wherein the memory system further includes a volatile memory to store third information, the third information being used to manage a correspondence between logical addresses and physical addresses, the physical addresses specifying storage locations in the non-volatile memory, the method further comprising:

after the power restoration, sequentially reading data in a block from a page in the next write order of the pages in the block where the writing operation is performed at the last among target pages of the first process, and restoring the third information using the logical address contained in the read data and the physical address of the read page;

in a case where the second error correction is failed, acquiring the logical address associated to the physical address of the second page from the first information; and in a case where the logical address acquired from the first information is associated to a third physical address different from the second physical address in the restored third information, not updating the first information using the second information.

19. The data control method according to claim 16, wherein the performing of the first error correction includes after the power restoration, sequentially reading the data in the block from the page in the next write order of the pages in the block where the writing operation is performed at the last before the page in an erase state among the target pages of the first process to perform the first error correction.

20. The data control method according to claim 16, wherein the information where the logical address contained in the read-out first data and the physical address of the second page are associated contains fourth information which indicates that the first information is updated using the second information, and the data control method further comprising:

including the fourth information in a read response which responds to a read request from the host.

* * * * *